United States Patent Office 3,503,529
Patented Mar. 31, 1970

3,503,529
ADHESIVE, METHOD OF USE AND BONDED ARTICLES
Francis E. Brown, Orange, Tex., assignor, by mesne assignments, to Gulf Oil Corporation, Pitttsburgh, Pa., a corporation of Pennnsylvania
No Drawing. Original application Nov. 15, 1963, Ser. No. 323,919. Divided and this application July 27, 1967, Ser. No. 665,942
Int. Cl. B65d *57/00;* B65g *1/14*
U.S. Cl. 214—10.5                    14 Claims

ABSTRACT OF THE DISCLOSURE

The invention relates to an adhesive held stack, said adhesive comprised of a normally tacky copolymer of ethylene and methyl methacrylate having copolymerized therein from about 33 to about 70 percent by weight of methyl methacrylate, said adhesive being applied to the lower surface of a polyethylene bag and the upper surface of another polyethylene bag stacked therebelow.

---

This application is a division of application Ser. No. 323,919 filed Nov. 15, 1963, now abandoned.

This invention relates to adhesives, more specifically to pressure sensitive adhesives. In a particular aspect the invention concerns methods and adhesives useful in bonding or laminating articles or substrates having glabrous surfaces and articles and assemblies produced by such methods. In another aspect the invention concerns adhesives having reduced tendency to creep under shear but which normally undergo cohesive failure under a tensile stress exceeding their tensile strength.

I have now discovered that an article of substrate having a glabrous surface can be bonded or laminated to another substrate or article, which may itself have a glabrous surface, by an adhesive composition comprising a normally solid copolymer of ethylene and methyl methacrylate having copolymerized therein from about 25 to about 70 percent by weight of methyl methacrylate.

By "glabrous" surface is meant a smooth surface which is substantially continuous, substantially free of surface irregularities and normally inert to chemical combination with common adhesive substituents. Such surfaces are normally difficult to adhesively bond or laminate, examples being, polyolefin surfaces such as polyethylene and polypropylene, various polyester surfaces such as "Mylar" polyester (registered trademark, E. I. dupont de Nemours & Co.), aluminum foil, glass and the like.

It appears that the aforementioned adhesive compositions can be used successfully to bond such glabrous surfaces because under sensitizing pressure the adhesive actually wets the substrate. (This conclusion is based upon the absence of an optical interface between two substrates bonded with these adhesives.) Those copolymers having 33–70 percent by weight methyl methacrylate copolymerized therein possess special utility since, although tacky, they are highly resistant to creep under shear but, if the strength of the substrates are sufficiently high, the adhesive will undergo cohesive failure under a tensile stress exceeding the tensile strength of the copolymer which will ordinarily be less than 1,000 p.s.i. This property makes the high methacrylate content adhesives particularly useful where the easy release of the adhesive bond is desirable but where the adhesive bond must withstand considerable shearing stress.

The useful adhesives described hereabove can be further described as normally solid, tacky copolymers of ethylene and methyl methacrylate having inherent viscosities measured in decalin at 130° C. of from about 1.0–1.1 (corresponding to a methacrylate content of about 25 wt. percent) to about 0.15–0.3 (corresponding to a methacrylate content of upwards of about 70 wt. percent). The copolymers having 33–70 wt. percent methyl-methacrylate content (mentioned hereabove as having special utility where cohesive failure of the adhesive bond is desired) will have an intrinsic viscosity of less than about 0.5.

These copolymers can be prepared by copolymerizing a feed mixture containing the appropriate amounts of comonomers under similar conditions and using techniques similar to those commonly employed in the preparation of ethylene homopolymer by the so-called "high pressure" polyethylene process. For example, a suitable process for preparing such copolymers having up to 50 wt. percent methyl methacrylate copolymerized therein is disclosed in copending application Ser. No. 165,451, filed Jan. 10, 1962 which is a continuation-in-part of application Ser. No. 50,882, filed Aug. 22, 1960, now abandoned. The same general techniques can be employed to prepare copolymers of even higher methacrylate content, e.g. upwards of 70%. When preparing these copolymers of up to 70% methacrylate content the viscosity of the copolymer will be generally lower than those copolymers having a lower methacrylate content. However, this can be corrected if desired by carrying out the polymerization at higher pressure and/or lower temperatures.

The adhesive copolymers can be applied to substrates by a variety of techniques such as dipping, brushing, spraying, etc. of melts or solutions and dispersions of the copolymers in a liquid carrier medium, usually an inert volatile liquid. Where solutions of the copolymers are employed the particular solvent employed is not highly critical and can be chosen on the basis of its cost, compatability with the substrate, solvent power for the copolymer, odor, volatility, toxicity and so forth. For example, I have found that chlorinated hydrocarbons such as perchloroethylene, trichloroethylene and tetrachloroethane are especially suitable for the above reasons and for the additional reason they are nonflammable. Other solvents such as the freons, aromatic hydrocarbons such as toluene, xylene, etc. are similarly useful under proper conditions.

Alternatively, the copolymer adhesive may be employed in the form of a suspension or dispersion of finely divided particles of the copolymer, particularly an emulsion. Such emulsions can be prepared by a variety of techniques, especially by known techniques such as dissolving the copolymer in a volatile solvent which is immiscible with water and mixing such solution with violent agitation and high shear with water containing an emulsifying agent.

In solution or emulsion form the copolymer content is not highly critical. For example, I employ from 2–4 percent to as high as 35 percent by weight successfully. In general higher copolymer concentrations and solvents having a high volatility are employed where the adhesive bond is to be formed quickly after applying the adhesive composition while lower copolymer concentrations and less volatile solvents may be employed where there is to be a longer interval between adhesive application and formation of the bond.

The adhesives herein described are useful in preparing laminates or adhesively bonded articles for a wide variety of applications, for example, pressure sensitive adhesive backings for polyethylene, polypropylene or Mylar-type tapes, resealable paper end wraps for polyethylene bread packages, for releasably sealing so-called "blister-pak" packages, and for preparing laminates of polyolefins such as polyethylene and polypropylene, nylon, Mylar, cellophane, chipboard, paper, aluminum foil and glass.

The adhesives described herein provide a solution to a particularly troublesome problem encountered in the storage and handling of materials, particularly dry powdered or granulated materials in bags such as paper or polyethylene bags. These filled bags are frequently stored and transported on "pallets," i.e., flat, substantially horizontal, rigid bases provided with recessed portions adapted to receive the lifting fork of a forktruck. To reduce the chance of the bags falling off the pallet they are typically arranged in horizontally interlocking vertically stacked relationship to form a vertical column of tiers of bags. Even when this precaution is observed there is a tendency for the bags to slip over one another and eventually cause the whole assembly to collapse. This is not only wasteful in terms of effort required to restack the bags and due to bag breakage but may often be highly dangerous, especially when the palleted assemblies are stacked one on top of another to form vertical stacks 30–40 feet high in warehouses.

I have found that by disposing the tacky adhesive compositions described herein between the tiers of bags in wetting contact with at least a portion of the upper surface of each bag and at least a portion of the lower surface of the bag next thereabove the bags will adhere to each other and slippage and collapse of the palleted stack of bags will be prevented. Nevertheless the individual bags can be easily removed from the palleted assembly because the adhesive readily undergoes cohesive failure without tearing the bags.

The application of the "palletizing adhesive" to the bags can be conveniently accomplished after filling the bags by running the bags over a wick or rotating brush applicator or by spraying as the bags leave the filling and sealing station. It will ordinarily suffice to apply the adhesive in one or two stripes about 1–2 inches wide running the length of one side of the packed bag or running the width of the bag with one stripe at each end of the bag.

EXAMPLE I

Preparation of a low methacrylate content copolymer

An ethylene homopolymerization reaction is initiated by continuously introducing a feed stream of polymerization grade ethylene (purity=99.9+mol percent) into a stirred autoclave-type reactor in which the pressure is maintained at 14,500 p.s.i.g., adjusting the temperature of the ethylene in the reactor to about 300° F., continuously introducing a free-radical type polymerization initiator (decanoyl peroxide) into the reactor at a rate sufficient to initiate the homopolymerization (e.g. 371 p.p.m. initiator on the basis of the weight of the ethylene feed) and adjusting the ethylene feed rate, and initiator rate to attain equilibrium polymerization conditions, e.g. 14,500 p.s.i.g. reactor pressure and 300 to 322° F. temperature in the polymerization zone of the reactor.

After equilibrium conditions have been achieved in the homopolymerization reaction the feed is gradually changed from substantially pure ethylene to a mixture of ethylene and methyl methacrylate containing 2.6 parts methyl methacrylate per one hundred parts ethylene (weight basis). The pressure is then adjusted to 21,500 p.s.i.g. and the polymerization zone temperature to 300° F. Unconverted feed materials and ethylene-methyl methacrylate copolymer are withdrawn from the reactor at equilibrium rate into a separation vessel maintained at 2,000 p.s.i.g. and the copolymer is separated from the gaseous unconverted feed materials.

The copolymer is a normally solid, tacky product having copolymerized therein 25 percent by weight methyl methacrylate, and having an intrinsic viscosity measured in decalin at 130° C. of 1.11.

EXAMPLE II

Preparation of a medium methacrylate content copolymer

The procedure of Example I is repeated except that the mixture of ethylene and methyl methacrylate fed to the reactor is 7.7 parts methacrylate per hundred parts ethylene (weight basis) the copolymerization pressure is 17,500 p.s.i.g. and copolymerization zone temperature is 320° F.

The product is a normally solid, tacky copolymer having copolymerized therein 45 percent by weight methyl methacrylate and having an intrinsic viscosity of 0.4 measured in decalin at 130° C.

EXAMPLE III

Preparation of a high methacrylate content copolymer

The procedure of Example I is repeated except that the mixture of ethylene and methylmethacrylate fed to the reactor is 14.06 parts of methacrylate per hundred parts of ethylene (weight basis) and, during the copolymerization the reactor pressure is maintained at 19,500 p.s.i.g. with a copolymerization zone temperature of 328° F.

The product is a normally solid tacky copolymer having copolymerized therein 70 percent by weight methyl methacrylate and having an intrinsic viscosity of 0.28 measured in decalin at 130° C.

What is claimed is:

1. The method of preventing slippage between polyethylene bags which are filled and arranged in horizontally interlocking, vertically stacked relationship which comprises coating at least a portion of the surface of each bag with a copolymer of ethylene and methyl methacrylate, said copolymer having copolymerized therein from about 33 to about 70 percent by weight of methyl methacrylate, prior to stacking said bags and arranging said filled bags so that said coating contacts and wets the surface of the bag vertically next immediate thereto.

2. An assembly comprising a flat, rigid, substantially horizontal base member, a plurality of packed polyethylene bags, and a palletizing adhesive, said bags being arranged in interlocking stacked relationship to form a substantially vertical column of tiers of bags, the lowermost of said tiers resting upon said base member, said palletizing adhesive being disposed between said tiers in wetting contact with at least a portion of the upper surface of each bag and at least a portion of the lower surface of the bag next thereabove, said adhesive comprising a normally solid tacky copolymer of ethylene and methyl methacrylate having copolymerized therein from about 33 to about 70 percent by weight of methyl methacrylate.

3. The method of preventing slippage between vertically stacked filled polyethylene bags which comprises;
   applying to at least a portion of the surface of each bag a stripe of an adhesive consisting essentially of a solid tacky copolymer of ethylene and methyl methacrylate having copolymerized therein from about 33 to about 70% by weight of methyl methacrylate prior to stacking said bags, then
   stacking said bags so that said adhesive contacts and wets the surface of the bag vertically next immediate thereto.

4. The method of claim 3 wherein the vertically stacked filled bags are arranged in a horizontally-interlocking relationship.

5. The method of claim 3 wherein said adhesive stripe is applied by running the bag in contact with a wick.

6. The method of claim 3 wherein said adhesive stripe is applied by running the bag in contact with a rotating brush applicator.

7. The method of claim 3 wherein the adhesive stripe is applied by spraying.

8. The method of claim 3 wherein the adhesive stripe is applied to run lengthwise across the bag.

9. The method of claim 8 wherein the stripe is one to two inches wide.

10. The method of claim 3 wherein the adhesive stripe is applied to run across the width of the bag.

11. The method of claim 10 wherein the stripe is one to two inches wide.

12. The method of claim 3 wherein the adhesive is applied in a liquid carrier medium.

13. The method of claim 12 wherein the liquid carrier medium is a solvent for the adhesive.

14. The method of claim 13 wherein the solvent is selected from the group consisting of chlorinated hydrocarbons and aromatic hydrocarbons.

References Cited

UNITED STATES PATENTS

| | | | |
|---|---|---|---|
| 2,784,131 | 3/1957 | Fletcher | 214—10.5 |
| 3,232,789 | 7/1966 | Pelzek et al. | 260—897 |
| 3,283,992 | 11/1966 | Hanson et al. | 229—53 |

FOREIGN PATENTS 1,022,796  1/1958  Germany.

GERALD M. FORLENZA, Primary Examiner

FRANK E. WERNER, Assistant Examiner

U.S. Cl. X.R.

161—252; 214—152; 206—65